United States Patent [19]
Childress

[11] Patent Number: 5,477,939
[45] Date of Patent: Dec. 26, 1995

[54] BRAKE-ENGAGING VEHICLE ANTI-THEFT SYSTEM

[76] Inventor: Guss U. Childress, 2130 Houser Rd., Holly, Mich. 48442

[21] Appl. No.: 275,435

[22] Filed: Jul. 15, 1994

[51] Int. Cl.⁶ .............................. B60T 17/16; B60R 25/08
[52] U.S. Cl. ..................... 180/287; 188/353; 303/89
[58] Field of Search ........................ 180/287; 188/353; 303/89

[56] References Cited

U.S. PATENT DOCUMENTS

| | | | |
|---|---|---|---|
| 1,230,449 | 6/1917 | Van Der Beck et al. | 70/181 |
| 1,231,125 | 6/1917 | Cahusac | 70/181 |
| 1,269,318 | 6/1918 | Schneider | 70/237 |
| 1,298,283 | 3/1919 | Bigelow | 70/237 |
| 1,303,110 | 5/1919 | Pfleeger | 188/31 |
| 1,638,062 | 8/1927 | Scherer | 70/237 |
| 1,706,352 | 3/1929 | Seguirant | 70/237 |
| 1,721,013 | 7/1929 | Fortin | 70/239 |
| 1,761,042 | 6/1930 | Langer | 70/237 |
| 2,585,711 | 2/1952 | Whitney et al. | 188/353 |
| 2,864,469 | 12/1958 | Schlumbrecht | 188/353 |
| 3,425,221 | 2/1969 | Canfield | 303/89 |
| 3,552,518 | 1/1971 | Aidner et al. | 137/101.21 |
| 3,572,472 | 3/1971 | Black | 303/89 |
| 3,669,210 | 6/1972 | Haefner | 180/287 |
| 3,800,279 | 3/1974 | Thompson | 303/89 |
| 4,258,819 | 3/1981 | Baptiste | 303/89 |
| 4,469,192 | 9/1984 | Schimek | 180/287 |
| 4,732,018 | 3/1988 | Crosby | |
| 4,765,362 | 8/1988 | Baruch | 70/237 |
| 4,934,492 | 7/1990 | Hayes-Sheen | 303/89 |
| 5,078,456 | 1/1992 | Cox | 303/89 |
| 5,086,868 | 2/1992 | Fontaine et al. | 180/287 |

*Primary Examiner*—Karin L. Tyson
*Attorney, Agent, or Firm*—Gifford, Krass, Groh, Sprinkle, Patmore, Anderson & Citkowski

[57] ABSTRACT

A vehicle anti-theft system includes components for engaging the brakes of the vehicle through the vehicle's hydraulic brake lines. In its preferred embodiment the system includes an auxiliary vacuum booster, an air plunger and cylinder assembly, a compressor for producing compressed air for moving the plunger with the vacuum booster, an arm connecting the plunger with the vacuum booster, an auxiliary brake master cylinder, and hydraulic fluid lines between the auxiliary brake master cylinder and the conventional fluid lines of the vehicle. Once parked, the compressor automatically engages and pressurizes the plunger and cylinder. The plunger presses against the vacuum booster utilizing the remaining vacuum available from the existing system. The vacuum booster acts against the auxiliary master cylinder to apply pressure on the fluid lines between the auxiliary master cylinder and the vehicle's existing hydraulic lines, thereby locking the vehicle brakes.

6 Claims, 2 Drawing Sheets

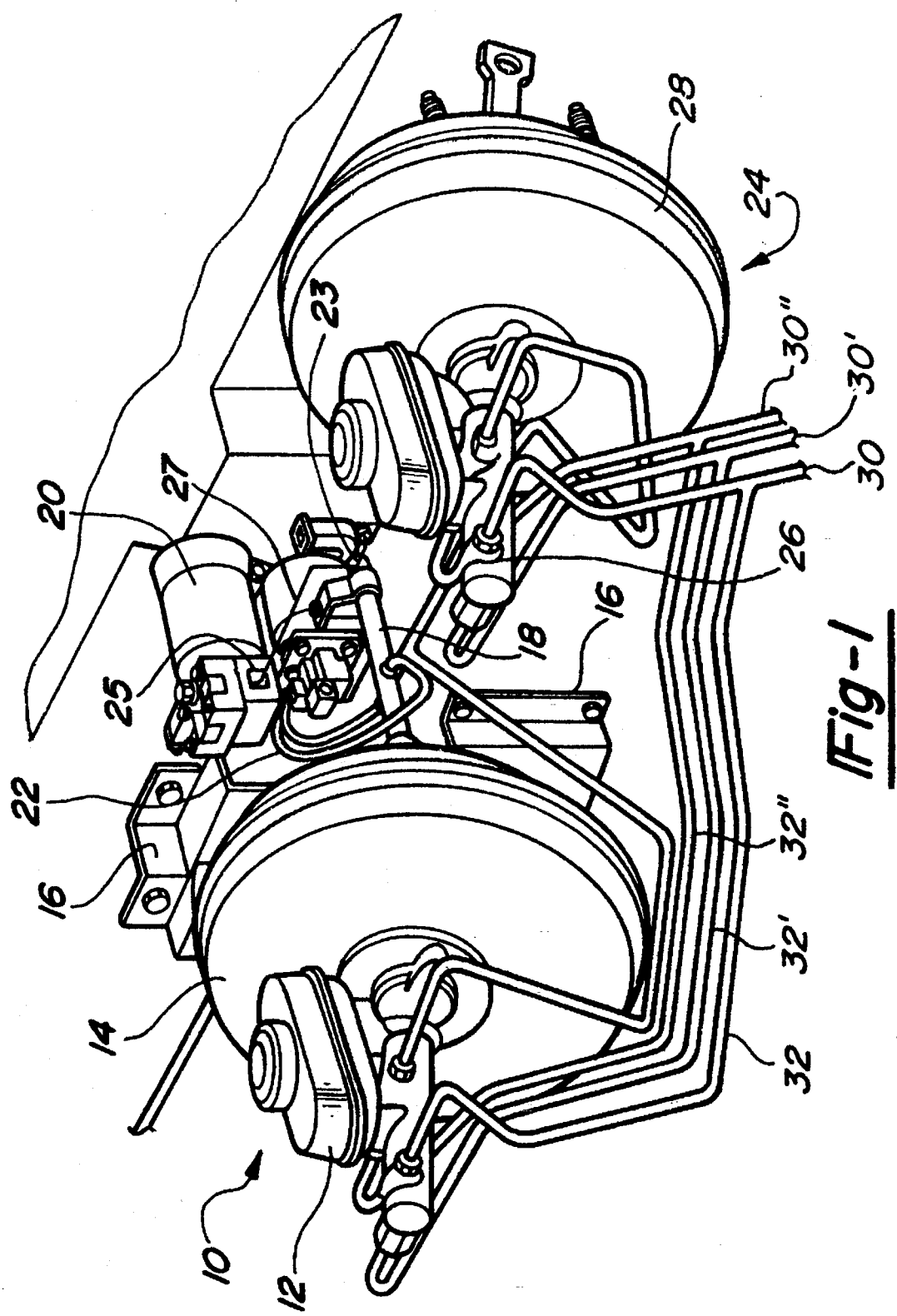

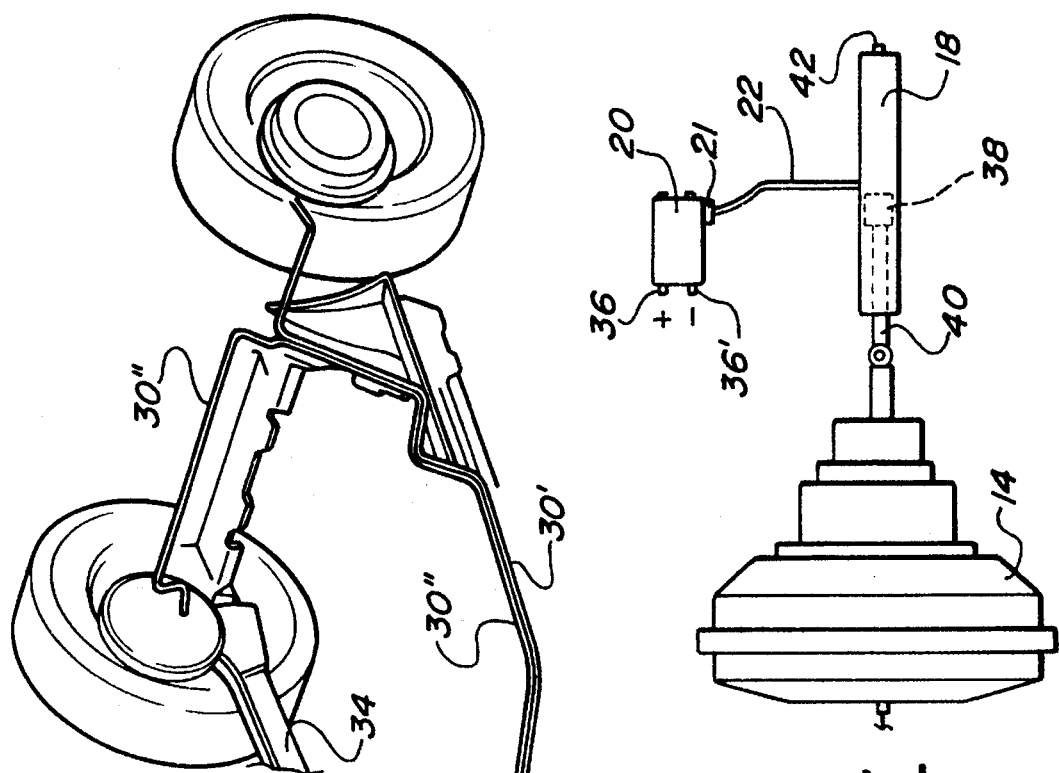
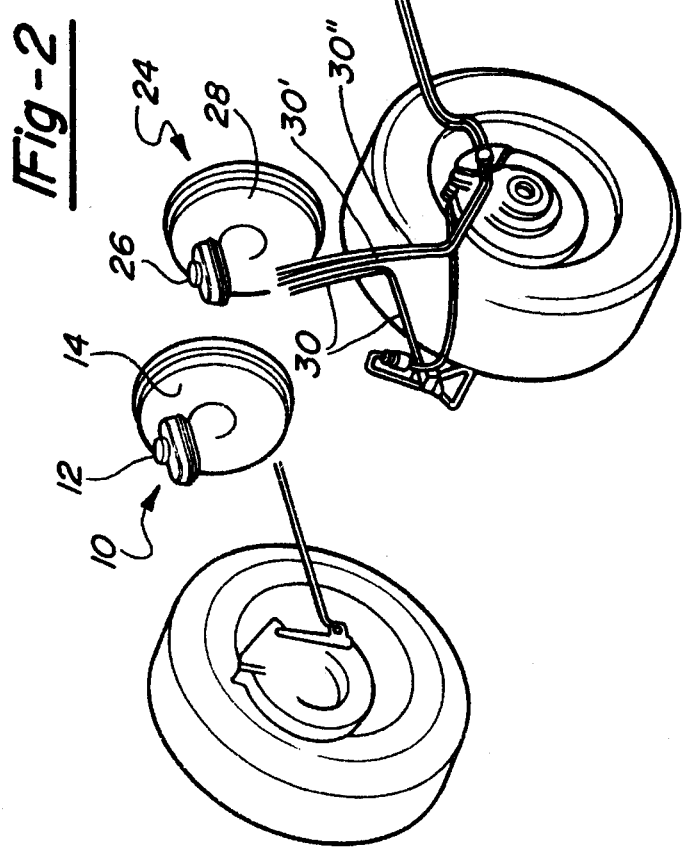

BRAKE-ENGAGING VEHICLE ANTI-THEFT SYSTEM

BACKGROUND OF THE INVENTION

I. Field of the Invention

The present invention relates generally to anti-theft systems for vehicles. More particularly, the present invention relates to a brake-engaging system that utilizes conventional vehicle parts to modify an existing hydraulic brake system.

II. Description of the Relevant Art

Anti-theft devices have been known for almost as long as the motor vehicle has been in use. Accessory locks for early vehicles such as the Ford Model "T" were designed to lock the steering wheel and ignition system.

Many of these early anti-theft devices were used to lock vehicle transmissions thereby preventing the engine from starting and subsequent movement of the vehicle. For example, U.S. Pat. No. 1,269,318 issued to Schneider shows an automobile lock for locking the teeth of a flywheel to prevent its rotation. Also disclosing a method of locking a flywheel is U.S. Pat. No. 1,706,352 issued to Sequirant. Relatedly, U.S. Pat. No. 1,298,283 issued to Bigelow locks the transmission gears of a vehicle. The transmission is also locked in U.S. Pat. No. 1,721,013 issued to Fortin.

Some of these early anti-theft devices provided methods for locking the wheels. For example, U.S. Pat. No. 1,231,125 issued to Cahusac teaches an electromechanical system for locking automobile wheels. A system for engaging and locking a wheel rim is disclosed in U.S. Pat. No. 1,303,110 issued to Pfleeger. A method of locking the wheels is also disclosed in U.S. Pat. No. 1,638,062 issued to Scherer.

Other systems have been developed that act on the braking system of the vehicle to thereby fix the vehicle in place. An early, relatively primitive electrical braking anti-theft system is disclosed in U.S. Pat. No. 1,230,449 issued to VanDerbeck. Vacuum control of the parking brake of a vehicle is disclosed in U.S. Pat. No. 3,552,518 issued to Aidner. Similarly, an anti-theft system using a vacuum chamber that is evacuated to set the brakes is disclosed in U.S. Pat. No. 3,669,210 issued to Haefner. Air pressure is used for engagement of the brakes of a vehicle in U.S. Pat. No. 4,732,018 issued to Crosby.

Almost all vehicles made in the last fifty years or so rely on hydraulic fluid systems for braking. In U.S. Pat. No. 4,765,362 issued to Baruch, an anti-theft system that utilizes hydraulic fluid is disclosed. According to this system, a special valve having various inlet and outlet ports for hydraulic fluid is used in a hydraulic system to lock the steering and brakes of a vehicle. The system utilizes a foot operated brake to pressurize the lines. When the valve is rotated in its housing by a key, it functions as a one-way valve, preventing the back-flow of brake fluid once the pressure on the brake pedal is relieved.

For all of this creativity, an efficient, easily attached, sure-locking vehicle anti-theft system is wanting. The above-described systems suffer either from excessive complexity, cost or are simply impractical for application to modern vehicles.

SUMMARY OF THE PRESENT INVENTION

The vehicle anti-theft system of the present invention overcomes these deficiencies by providing a system that is relatively easy to attach to existing brake systems. The component parts of the system of the present invention are essentially off-the-shelf items, thus keeping the cost of the system low. Because the system is used in conjunction with existing brake systems, the user is assured of having the security and locking effectiveness of his vehicle's own brakes.

The vehicle anti-theft system of the present invention includes components for engaging the brakes of the vehicle through the vehicle's hydraulic brake lines. In its preferred embodiment the system includes an auxiliary vacuum booster, an air driven plunger and locking cylinder assembly, a compressor for producing compressed air for moving the plunger, an arm connecting the piston with the vacuum booster, an auxiliary brake master cylinder, and hydraulic fluid lines between the auxiliary brake master cylinder and the conventional fluid lines of the vehicle. The hydraulic lines of the anti-theft system are fluidly connected to the existing hydraulic lines of a vehicle. Each of these components is typically available as an off-the-shelf part, thus minimizing cost and maximizing compatibility with the original system.

An alternate embodiment of the system of the present invention includes an air driven plunger and locking cylinder assembly, a compressor for producing compressed air for moving the plunger, and an arm connecting the plunger with the existing vacuum booster of a vehicle.

Once the vehicle is parked in its desired location, the compressor automatically engages and pressurizes the plunger within the cylinder. The plunger presses against the vacuum booster through the connecting arm that connects the two components by utilizing the remaining vacuum available from the existing system once the engine is shut off. (In a properly functioning vacuum system, there are usually two activations by the vacuum booster available after the engine is switched off.)

With the pressure of the connecting arm, the vacuum booster acts against the auxiliary master cylinder to apply pressure on the fluid lines between the auxiliary master cylinder and the vehicle's existing hydraulic lines, thereby locking the vehicle brakes. The compressor may be occasionally automatically activated to reintroduce pressure into the plunger and locking cylinder assembly in the event that the vehicle is idle for a long period of time. This prevents the anti-theft system of the present invention from disengaging.

Restarting of the vehicle's engine signals an outlet valve provided on the locking cylinder that opens to release the pressure from inside the locking cylinder. The escaping of the air allows the plunger to release pressure from the vacuum booster, and the brakes are thereby released.

Other advantages and features of the present invention will become more apparent from the following detailed description when read in conjunction with the accompanying drawings.

BRIEF DESCRIPTION OF THE DRAWINGS

The present invention will be more fully understood by reference to the following description of the preferred embodiments of the present invention when read in conjunction with the accompanying drawings in which like reference characters refer to like parts throughout the views and in which:

FIG. 1 is a perspective close-up view of the brake-engaging vehicle anti-theft system of the present invention;

FIG. 2 is a perspective view of the auxiliary vacuum booster/master cylinder assembly of the present invention in association with the hydraulic lines, wheels, and stock vacuum booster/master cylinder; and FIG. 3 is a side elevational view illustrating the accessory vacuum booster, the plunger and locking cylinder assembly, and locking cylinder compressor.

DETAILED DESCRIPTION OF THE PREFERRED EMBODIMENTS OF THE PRESENT INVENTION

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a perspective close-up view of the preferred embodiment of the auxiliary vacuum booster/master cylinder assembly of the present invention, generally indicated as 10, in association with the stock vacuum booster/master cylinder assembly, generally indicated as 24.

The auxiliary system includes an auxiliary master cylinder 12, an auxiliary vacuum booster 14, and a supporting frame 16 for the auxiliary vacuum booster 14. The auxiliary vacuum booster 14 is acted on by a plunger (not shown in this figure) movably encased in a locking cylinder 18. An auxiliary air compressor 20 actuates the plunger inside the locking cylinder 18 by directing compressed air through a high pressure air line 22. (While a vacuum booster is used in the preferred embodiment, it must be understood that the plunger can act on the auxiliary master cylinder directly, although such movement would meet more resistance than if the booster were used.)

A pressure sensor 23 is fitted between the compressor 20 and the locking cylinder 18 to verify that pressure within this closed system is maintained at a predetermined minimum value. In the event that the pressure falls below this value, the compressor 20 automatically is engaged to repressurize the system to assure that pressure on the vacuum booster 14 is maintained.

It should be understood that while a compressed air/plunger arrangement is shown, an alternate method of actuating the vacuum booster 14 may be used, such as a solenoid or a geared electric motor.

The auxiliary master cylinder 12, the auxiliary vacuum booster 14, the locking cylinder 18, and the air compressor 20 are conventional pieces and are off-the-shelf components. Preferably the master cylinder 12 and the vacuum booster 14 are of the same type and manufacture as those conventionally provided on the particular vehicle as stock equipment.

With respect to this equipment, the stock vacuum booster/master cylinder assembly 24 comprises a stock master cylinder 26, a stock vacuum booster 28, and a plurality of stock hydraulic fluid lines 30, 30', 30".

A plurality of auxiliary hydraulic fluid lines 32, 32', 32' connect the auxiliary master cylinder 12 with the stock hydraulic fluid lines 30, 30', 30".

FIG. 2 is a perspective view of the overall anti-theft braking system of the present invention. The relative positions of the auxiliary vacuum booster/master cylinder assembly 10 and the stock vacuum booster/master cylinder assembly 24 are illustrated. The stock hydraulic fluid lines 30, 30', 30" are also shown. As illustrated, the lines 30, 30', 30" are conventionally situated along a vehicle frame 34. While the assembly 10 is shown situated next to the assembly 24, it should be understood that alternative placement of the auxiliary assembly 10 is possible. In any event, placement of the assembly 10 should be done with practicality and convenience in mind.

FIG. 3 illustrates an elevated side view of the auxiliary vacuum booster 14, the locking cylinder 18, the auxiliary compressor 20, and the high pressure air line 22. The compressor 20 includes a pair of power contacts 36, 36'.

A plunger 38 is shown in broken lines. The plunger 38 is axially movable within the locking cylinder 18. A connecting arm 40 connects the plunger 38 with the auxiliary vacuum booster 14. In use, a driver shuts off the engine once the vehicle is parked in a desired position. Thereafter, the compressor 20 is automatically engaged by an activation switch 21 which is connected to the line 22 and creates a pressure within the line 22. The pressure acts on the plunger 38, which then acts upon the vacuum booster 14 through the arm 40. The vacuum booster 14 relies on the vacuum produced in the intake manifold of an operating engine. However, even when the engine is off, a vacuum temporarily remains in the system. The anti-theft system of the present invention relies on this temporary vacuum to assist in powering the auxiliary master cylinder 12. A single movement of the vacuum booster 14 is all that is necessary to maintain pressure on the auxiliary master cylinder 12.

As noted, the compressor 20 may be occasionally activated by the pressure sensor 23 in the event that the pressure within the closed system falls below a given value. The compressor 20 has a compressor switch 25 electrically connected to the pressure sensor, at 27, and is capable of switching on the compressor 20 when the sensor senses a drop in fluid pressure below a selected pressure value.

With the conventional plunger (not shown) of the master cylinder 12 in its advanced position such that the hydraulic fluid is forced into the auxiliary lines 32, 32', 32", and this fluid acts on the fluid within stock hydraulic fluid lines 30, 30', 30" to lock the brakes of the vehicle. The brakes remain locked until the vehicle operator turns on the vehicle's engine or otherwise activates a switch at which time a valve 42 responds and opens, releasing the compressed air from within the locking cylinder 18. Mechanical pressure is thereby removed from the auxiliary vacuum booster 14 and the related auxiliary master cylinder 12, and the hydraulic fluid forced through the auxiliary hydraulic fluid lines 32, 32', 32" more or less returns to its pre-braked position.

Having described my invention, many modifications thereto will become apparent to those skilled in the art to which it pertains without deviation from the spirit of the invention as defined by the scope of the appended claims.

I claim:

1. In combination with fluid brake lines of a vehicle, said vehicle including an engine capable of being turned on and off, a vehicle anti-theft system, said system comprising:

a brake master cylinder;

a plunger assembly movably connected to said brake master cylinder;

said plunger assembly including a connecting arm and a plunger secured to an end of said connecting arm, cylinder shaped housing enclosing said connecting arm and said plunger;

means for moving said plunger assembly means for moving said push rod being connected to said push and means for initiating movement in said means for moving said plunger assembly, said initiating means including a fluid compressor and a fluid line extending from said compressor and connnecting to said cylinder housing, said moving means applying fluid pressure through said fluid line to said housing to move said plunger assembly; and at least one auxiliary fluid line, said auxiliary fluid line fluidly connecting said master cylinder with the brake lines of the vehicle.

2. The vehicle anti-theft system as described in claim 1, further including a vacuum booster, said vacuum booster being disposed between said brake master cylinder and said means for moving said plunger assembly.

3. The vehicle anti-theft system as described in claim 1, further including a pressure sensor and a compressor switch, said pressure sensor being attached between said fluid compressor and said cylinder, said compressor switch being capable of switching on said fluid compressor when said pressure sensor senses a drop in fluid pressure below a selected pressure value.

4. The vehicle anti-theft system as described in claim 3, further including an activating switch, said activating switch being connected with said means for initiating movement in said means for moving said plunger assembly, said activating switch activating said means for initiating movement in said means for moving said plunger assembly when the vehicle engine is off and deactivating said means for initiating movement in said means for moving said plunger assembly when the vehicle engine is on.

5. The vehicle anti-theft system as described in claim 1, further including a release valve, said release valve being provided on said cylinder housing, said release valve releasing pressure from within said cylinder when the engine in the vehicle is turned on.

6. The vehicle anti-theft system as described in claim 1, further including an activating switch, said activating switch being connected with said means for initiating movement in said means for moving said plunger assembly, said activating switch activating said means for initiating movement in said means for moving said plunger assembly when the vehicle engine is off and deactivating said means for initiating movement in said means for moving said plunger assembly when the vehicle engine is on.

\* \* \* \* \*